United States Patent [19]

Persson

[11] Patent Number: 4,692,084
[45] Date of Patent: Sep. 8, 1987

[54] LIFTING APPARATUS

[76] Inventor: Bertil Persson, Stora Uppåkra 6, S-225 90 Lund, Sweden

[21] Appl. No.: 802,052

[22] Filed: Nov. 25, 1985

[30] Foreign Application Priority Data

Nov. 28, 1984 [SE] Sweden ............................. 8405994

[51] Int. Cl.⁴ ............................................. B65F 3/00
[52] U.S. Cl. .................. 414/607; 414/421; 414/912; 212/261; 254/122; 254/2 R; 187/9 R; 187/18
[58] Field of Search ............... 414/419, 421, 422, 425, 414/434, 754, 785, 337, 350, 383, 403, 404, 424, 437, 590, 610, 680, 684, 912, 420; 187/9 R; 212/259, 261; 254/2 R, 4 R, 6 R, 7 R, 8 R, 9 R, 10 R, 122

[56] References Cited

U.S. PATENT DOCUMENTS

| 2,570,726 | 10/1951 | Smith | 414/437 |
|---|---|---|---|
| 2,585,856 | 2/1952 | Schmieder | |
| 2,669,423 | 2/1954 | Pehrsson | |
| 2,756,886 | 7/1956 | Schaffer | 414/607 |
| 3,086,618 | 4/1963 | Christiansen | |
| 3,270,900 | 9/1966 | Sherman | 414/607 X |
| 3,270,901 | 9/1966 | Ord | 414/421 |
| 3,347,399 | 10/1967 | Ensinger | 414/421 |
| 3,618,894 | 11/1971 | Meyer | |
| 3,685,674 | 8/1972 | Bruer et al. | 414/421 |
| 3,893,579 | 7/1975 | Glewwe | 414/607 X |
| 4,451,198 | 5/1984 | Sanderson | 414/684 X |
| 4,503,983 | 3/1985 | Lew | 254/2 R X |

FOREIGN PATENT DOCUMENTS

| 1182079 | 11/1964 | Fed. Rep. of Germany | 414/608 |
|---|---|---|---|
| 2032025 | 1/1972 | Fed. Rep. of Germany | 414/608 |
| 1030473 | 5/1966 | United Kingdom | |
| 1374163 | 11/1974 | United Kingdom | |

Primary Examiner—Frank E. Werner
Attorney, Agent, or Firm—Bacon & Thomas

[57] ABSTRACT

The present invention relates to a lifting apparatus, especially a barrel tilter, which is preferably raisable and movable by means of a low lift truck (4). To eliminate the need for power units in each of the lifting apparatuses, the lifting apparatus (1, 37, 45, 50) comprises a base member (2) onto which a low lift truck (4), preferably a lift truck by means of which the lifting apparatus is raisable and movable, can be driven to weight the base member (2) from above, and a lifting unit (3) movably connected to the base member (2) is so arranged in relation to the base member (2) that the parts of the truck (4) which are to perform lifting are positioned beneath the lifting unit (3) when the truck (4) has been driven onto the base member (2), whereby the lifting unit (3) can be operated by the parts of the truck (4) adapted to perform lifting to impart lifting movements to the lifting unit (3) while the base member (2) is weighted by the truck (4).

9 Claims, 10 Drawing Figures

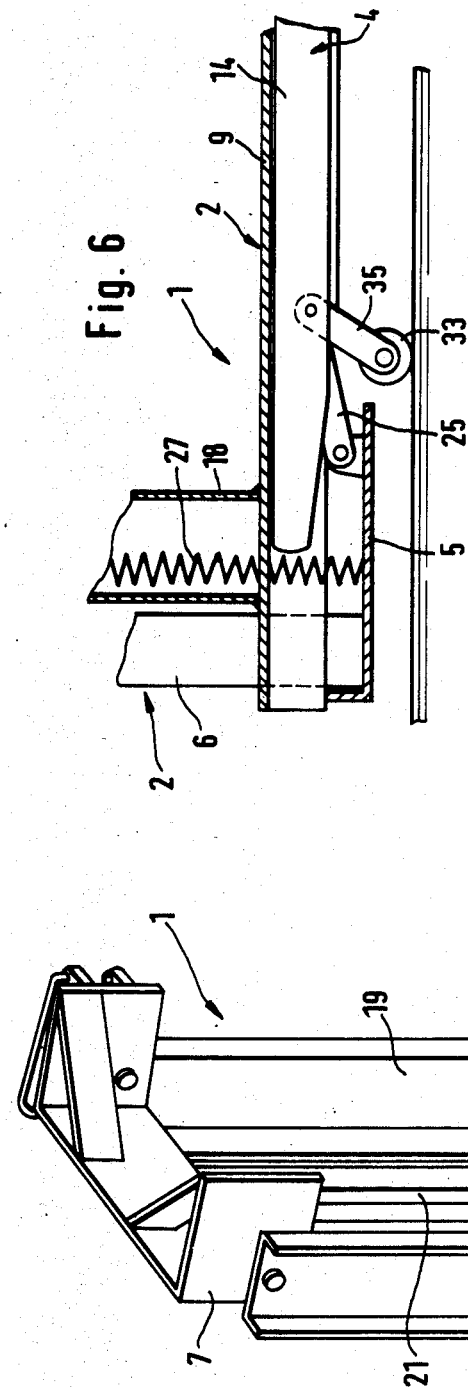

LIFTING APPARATUS

This invention relates to a lifting apparatus, especially a barrel tilter, which is preferably arranged to be raised and moved by means of a low lift truck.

Small lifting apparatuses of the stationary or particularly transportable type usually have their own power units for performing the lifting movement. The cost of such power units is high compared to the total cost of the lifting apparatus and to this comes the cost for the mounting and maintenance of these power units. For example, the cost of a hydraulic piston and cylinder unit for a simple lifting apparatus in the form of a barrel tilter, a scissors type elevating platform or a simple crane for workshop usage may amount to as much as half the total price of the lifting apparatus.

The present invention therefore has for its object to overcome this problem by entirely eliminating the cost of the power unit without however raising the price of the construction of the lifting apparatus.

According to the invention, this is accomplished mainly by the characteristic features disclosed and claimed herein.

By imparting these characteristic features of the invention to the lifting apparatus it is attained that a plurality of lifting apparatuses can be operated with the aid of one and the same low lift truck which may preferably also be used to transport the lifting apparatus.

The invention is described more in detail in the following, reference being had to the accompanying drawings in which:

FIG. 5 illustrates the barrel tilter when transported by means of the low lift truck;

FIG. 6 is a section of parts of the barrel tilter when the latter is raised by the low lift truck;

Figure 1:
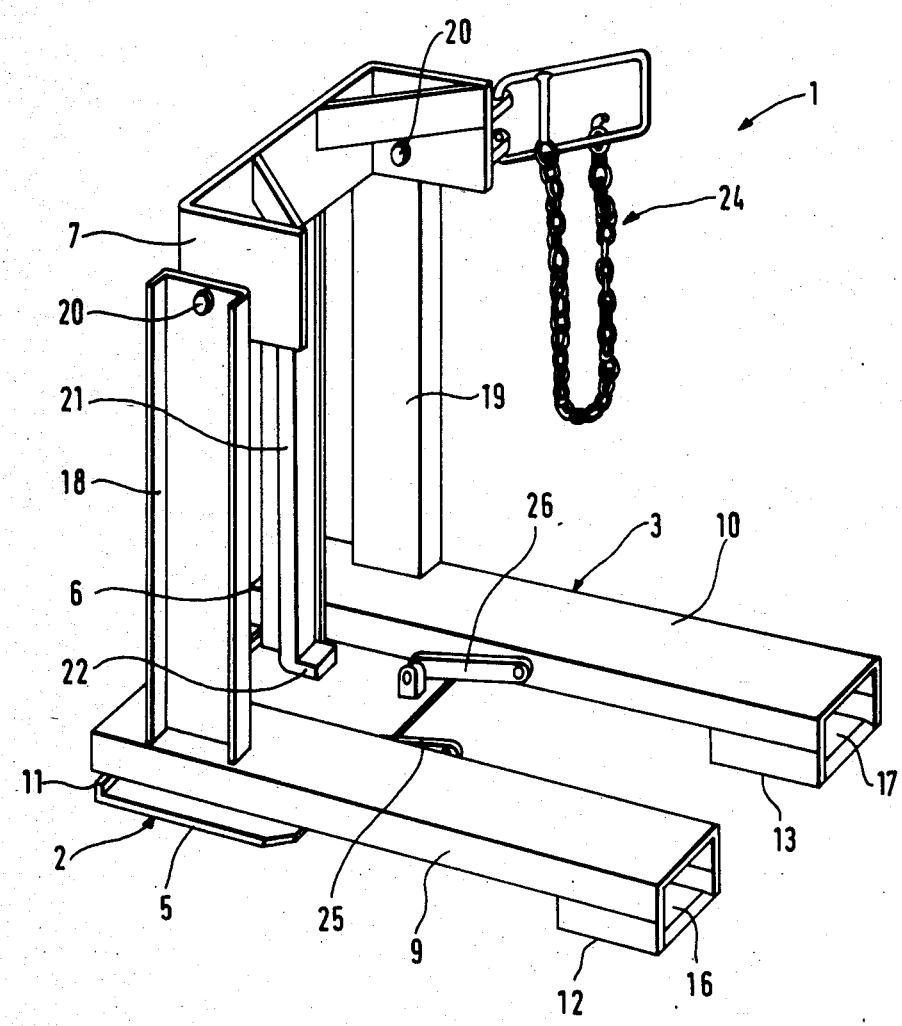
FIG. 1 is a perspective view of a lifting apparatus of the invention in the form of a barrel tilter.
Figure 2:
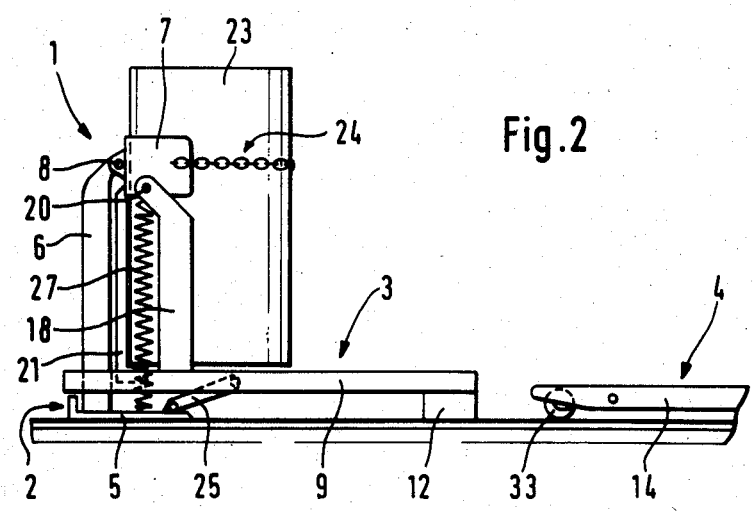
FIG. 2 is a side view of the barrel tilter shown in FIG. 1 in which a barrel has been placed on the barrel tilter.

The lifting apparatus illustrated in FIGS. 1 to 6 is a so-called barrel tilter 1, i.e. a device for emptying a barrel by lifting and tilting it at an angle of approximately 90° from the initial position. The barrel tilter comprises a base member 2 and a lifting unit 3 movably connected with said base member and raisable by means of a low lift truck 4. The base member 2 consists of a foot plate 5 having an upstanding column 6 thereon to which a barrel tilting means 7 is pivoted so as to turn about a horizontal axis of rotation 8.

The lifting unit 3 comprises two horizontal beams 9 and 10 which are adapted in lowered position to bear against an upwardly directed edge 11 of the foot plate 5 and via supports 12 and 13 against the floor. The beams 9, 10 are of U-shape in cross section and they are placed with their flanges directed downwardly so that the lift forks 14 and 15 of the low lift truck 4 permit being placed beneath said beams. Considering that the supports 12, 13 are closed at the underside by means of bottom portions 16, 17 there are formed tubular portions at the end sections of the beams 9, 10 in which the lift forks 14, 15 engage during the lifting movement. Said tubular parts prevent the barrel tilter 1 from keeling over during lifting or transport as the bottom portions 16, 17 will abut against the undersides of the lift forks 14, 15 on unbalance. The horizontal beams 9, 10 comprise upstanding beams 18 and 19 to the upper ends of which the barrel tilting means 7 is pivoted at points 20 which are laterally offset in relation to the axis of rotation 8 so that the barrel tilting means 7 is turned about the axis of rotation 8 by the raising of the lifting unit 3 (see FIGS. 2 and 3).

The barrel tilting means 7 comprises a downwardly extending brace 21 with a laterally projecting flange 22 on which a barrel 23 to be tilted is meant to be supported. The barrel 23 is held to the barrel tilting means 7 and to the flange 22 with the aid of a locking device 24. The barrel tilting means 7 preferably cooperates with a stop means (not shown), which implies that the barrel tilting means 7 cannot take a position in which the downwardly extending brace 21 is directed entirely vertically, but the brace 21 abuts against the stop means before it reaches this position. It is hereby attained that when being swung upwards the barrel tilting means 7 with the barrel 23 moves directly upwards without first swinging downwards and then upwards. In addition, the barrel tilter 1 has a locking device (not shown) which permits locking of the barrel tilting means 7 in relation to the base member 2 in a position in which the barrel 23 is swung upwards (FIG. 3 or 4), whereby the lift truck 4 is relieved of load and can be removed when necessary, for possible use elsewhere.

Figure 3:
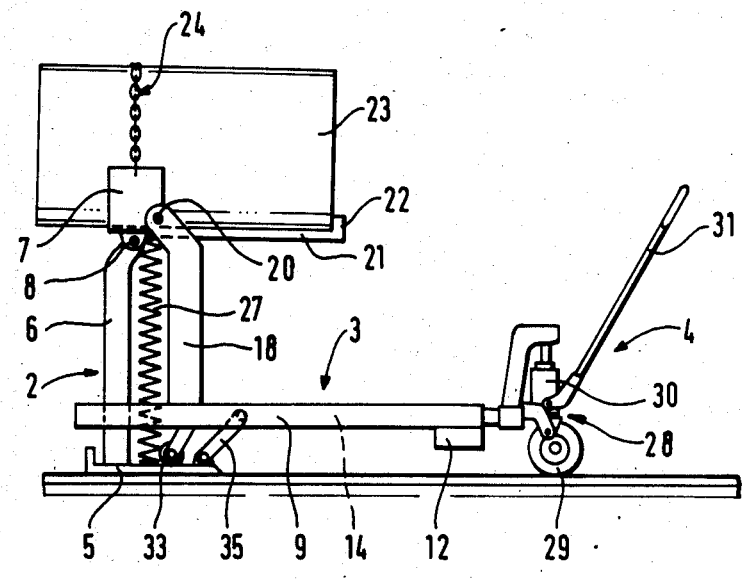
FIG. 3 illustrates the barrel tilter with the barrel raised and tilted by means of a low lift truck.
Figure 4:
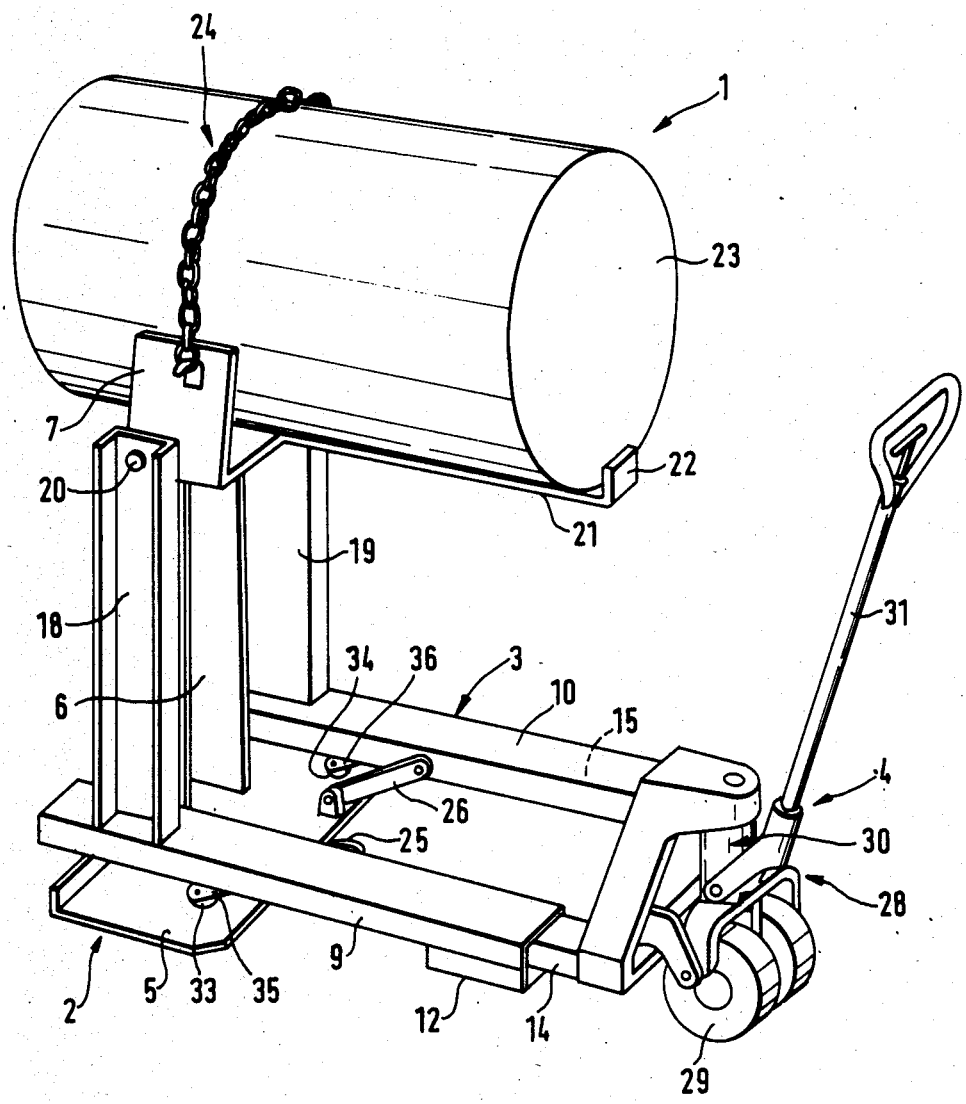
FIG. 4 is a perspective view of the barrel tilter with the barrel raised and tilted.

A keeling-over protection means (not shown) is preferably disposed on the base member 2, and said protection means cooperates with the barrel tilting means 7 in such manner that it stops the upward swinging movement of the barrel tilting means 7 when the latter has reached an upper end position, e.g. the one shown in FIG. 3.

To provide the requisite stability between the base member 2 and the lifting unit 3 during the entire lifting movement, there may be arranged between the foot plate 5 and each beam 9, 10 link arms 25 and 26 which are hinged to the foot plate 5 and the beams 9, 10. Other kinds of stabilishing means or surfaces can be substituted for the link arms 25, 26.

A hauling-up device 27, such as a coil spring, is arranged between the foot plate 5 and the upper parts of the lifting unit 3, said hauling-up device being adapted to haul up the base member 2 from the floor when the lifting apparatus is raised by the lift truck 4, without the latter weighting the foot plate 5. As a result, the base member is carried along upwards when the lifting apparatus is raised by the low lift truck 4 in order to be transported on the truck.

In this instance the lift truck 4 is a simple forklift truck with a manually operable lifting device. The forklift truck has a chassis 28 with rear wheels 29 and a hydraulic piston and cylinder unit 30 which is operable by means of an operating rod 31 for raising the liftforks 14 and 15 of the truck. Said liftforks 14 and 15 comprise front wheels 33 and 34 disposed on arms 35 and 36 which can be swung by means of a mechanism (not shown) for raising the liftforks 14, 15. Lift trucks of this type being well known, the component parts thereof and their function have not been described in detail.

To tilt the barrel 23 disposed on the barrel tilter 1 the lift truck 4 is driven up to the barrel tilter 1 until the forks 14, 15 of the truck 4 occupy the lifting position beneath the beams 9, 10 and the front wheels 33, 34 of the truck 4 are placed on the foot plate 5 to keep said plate down. By making pumping movements with the operating rod 31 the hydraulic piston and cylinder unit 30 will raise the liftforks 14, 15, urging the beams 9, 10 and thus the lifting unit 3 upwardly. As the base member 2 cannot partake in the upward movement because it is weighted by the truck 4, the barrel tilting means 7 will rotate, carrying the barrel 23 along until it has been swung upwardly and rearwardly to such an extent that it is emptied of its content (see FIG. 3). Permitting the hydraulic piston and cylinder unit to revert, the lifting unit 3 is lowered and the barrel tilting means 7 with the barrel 23 returns to the initial position.

Transport of the barrel tilter 1 by means of the lift truck 4 is brought about by placing the truck 4 with its liftforks 14, 15 beneath the beams 9, 10 but without the truck 4 being driven so far forwardly that its front wheels 33, 34 roll onto the foot plate 5. By raising the liftforks 14, 15 of the truck 4 when it occupies this position the entire barrel tilter 1 is lifted since the base member 2 is not under load but can partake in the upward movement. If the base member 2 is lifted by a hauling-up device 27 it suffices to raise the lifting unit 3 slightly above the floor in order that the entire barrel tilter 1 shall go free from the floor. After that, the barrel tilter 1 can be transported to a suitable location by means of the truck 4.

Figure 7:
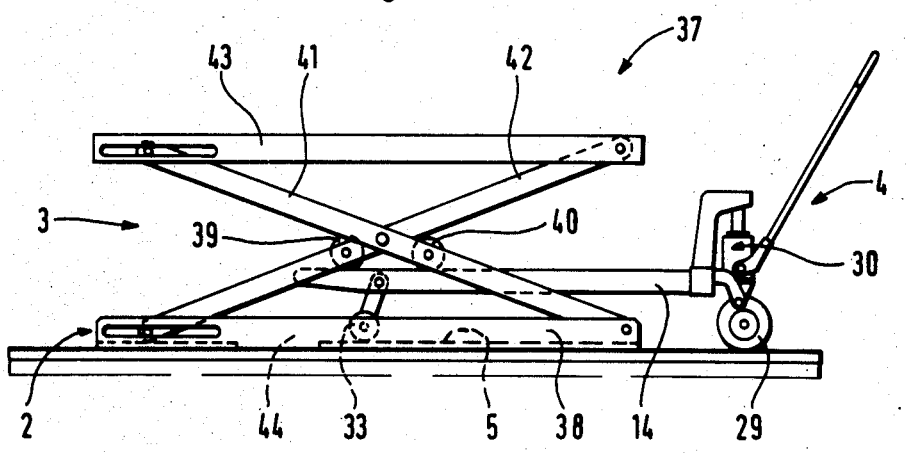
FIG. 7 is a side view of a lifting apparatus in the form of a scissor-type elevating platform, the lifting unit of the platform being raised slightly by means of the low lift truck.

It is shown in FIG. 7 how a scissor-type elevating platform 37 is designed so as to permit manipulation and transport by means of a lift truck 4. In this case the front wheels 33, 34 of the lift truck 4 can be driven onto a foot plate 5 of a base member in the form of a subframe 38 of the scissor-type elevating platform 37, the liftforks 14, 15 of the truck 4 being positioned beneath a lifting unit which comprises rollers 39 and 40 on the scissor means 41 and 42 of the scissor-type elevating platform 37, the platform 43 proper being mounted on said scissor means 41, 42. The platform 43 is raised in that the liftforks 14, 15 of the truck 4 urge the rollers 39, 40 and thus the scissor means 41, 42 upwards.

Figure 8:
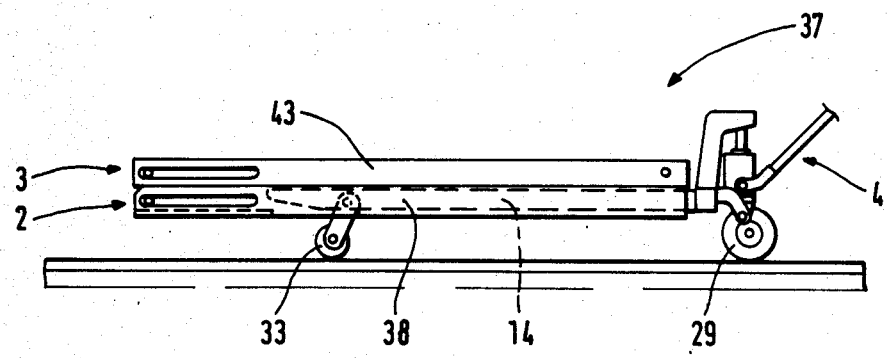
FIG. 8 illustrates the scissor-type elevating platform shown in FIG. 7 when transported by means of the low lift truck.

The foot plate 5 in this case has an opening 44 in which the front wheels 33, 34 of the truck 4 can be placed. If the scissor-type elevating platform 37 is raised with the front wheels 33, 34 of the truck 4 placed in the opening 44, the subframe 38 is not kept down during the lifting but can also be lifted, whereby the scissor-type elevating platform 37 permits being lifted in its entirely and carried away by means of the truck 4 (see FIG. 8).

Figure 9:
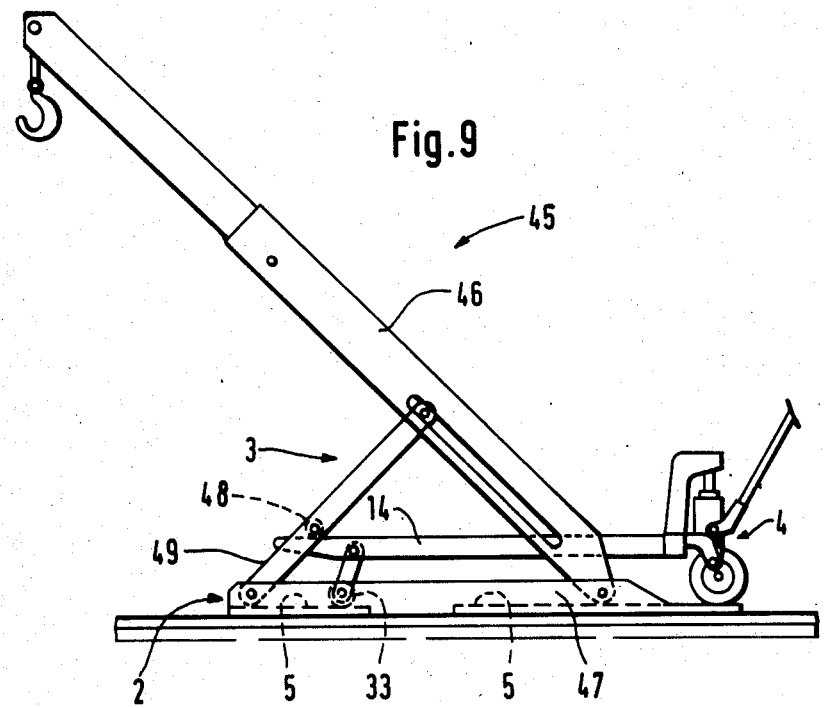
FIG. 9 is a side view of a lifting apparatus in the form of a crane, the lifting unit of the crane being raised by means of a low lift truck.

In FIG. 9 there is shown a crane 45 which is so designed that its jib 46 can be swung upwards with the aid of the lift truck 4. In this case the front wheels 33, 34 can be placed on a foot plate 5 on the base member of the crane, which is in the form of a subframe 47, and the liftforks 14, 15 can cooperate with a roller 48 mounted on a swinging member 49 which is part of the lifting unit of the crane. The swinging member 49 cooperates in such a manner with the jib 46 that said jib 46 is swung upwards when the swinging member 49 is swung upwards with the aid of the truck 4.

Figure 10:
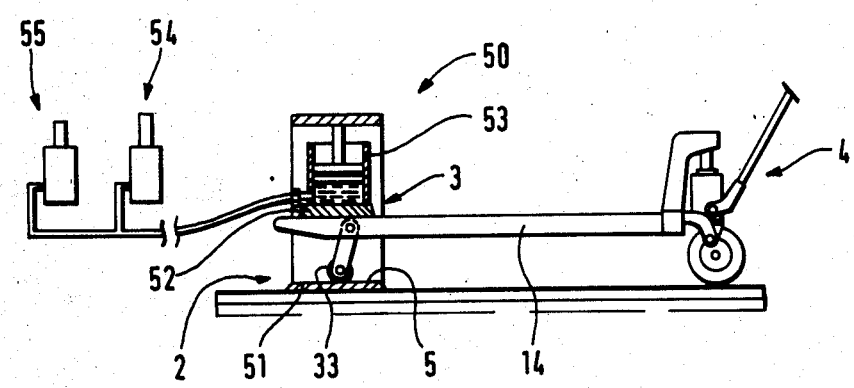
FIG. 10 is a side view diagrammatically showing a lifting apparatus in the form of a hydraulic piston and cylinder unit, the lifting unit of the piston and cylinder unit being raised by means of a low lift truck.

Finally, there is shown in FIG. 10 a power generating hydraulic piston and cylinder unit 50 which is operable with the aid of the lift truck 4. In this case, the base member 2 is designed as a frame 51 having a foot plate 5, and the lifting unit comprises a plate 52 which is raisable by means of the liftforks 14, 15 of the truck 4. Lifting said plate 52 will increase the pressure in the cylinder 53 and the pressure increase thus generated can be exploited at various points 54, 55 for various purposes.

It will appear from the above description that none of the lifting apparatuses 1, 37, 45 and 50 illustrated has a power unit of its own for performing the lifting movements, but are instead constructed such that it shall be possible to bring about the lifting movements thereof by means of the lifting assembly 30 of the lift truck 4. Thus the lift truck 4 can be utilized to operate the lifting units of many lifting apparatuses of one type or different types. Preferably, the lifting apparatuses are also designed in such a manner that they can be transported by the lift truck, but in some cases the lifting apparatuses can be designed to carry out lifts by means of the lift truck 4 only, but not so as to permit also being transported by the truck.

To show that the lift truck 4 can be utilized for operation and potential transport of different lifting apparatuses, four such apparatuses have been shown and described, but the lift truck 4 can of course be employed in connection with other types of lifting apparatuses and on condition that they are designed for the necessary cooperation with the truck 4. The truck need not necessarily be of the manually operated type illustrated as also motor-driven types of lift trucks of various kinds can be used for the purposes in question. In other words, the invention is not restricted to the embodiments described above and illustrated in the drawings but can be varied within the spirit and scope of the appendant claims.

I claim:

1. A lifting apparatus operable by a lift truck provided with a lift fork movably mounted on lift means, wheel means and a power unit, which lifting apparatus comprises:
    (a) a base member;
    (b) a lifting unit connected by means of pivotal linkage means to the base member and movable relative thereto:
    (c) the base member including means for selective engagement by the wheel means of the lift truck;
    (d) the lifting unit including means engageable by the lift fork of the lift truck; and
    (e) wherein when the wheel means of the lift truck are in overlying engagement with the base member, the lift fork of the lift truck may impart a lifting movement to the lifting unit while the base member resting on a support surface remains in a stationary position on said support surface, and when the wheel means of the lift truck are not in engagement with the base member and the lift fork changes lateral position relative to the engageable means of the lifting unit, the lift fork of the lift truck may lift both the lifting unit and the base member from said support surface.

2. The lifting apparatus of claim 1 further including a tilting means pivotally connected to the lifting unit for securing a barrel, whereby when the wheel means of the lift truck are in overlying engagement with the base member, the lift fork of the lift truck may lift the lifting unit for tilting the barrel.

3. The lifting apparatus of claim 2 wherein the means for selective engagement by the wheel means of the lift truck includes a foot plate carried by the base member, the base member further including a column supported on the foot plate and extending upwardly therefrom, the tilting means being pivotally connected to the column, the means engageable by the lift fork of the lift truck includes a pair of lower beams and a pair of upstanding beams supported on the lower beams, the tilting means being pivotally connected to the upstanding beams, and the pivotal connection of the tilting means to the upstanding beams being laterally offset from the axis of rotation defined by the pivotal connection of the tilting means to the column, whereby the tilting means is caused to be rotated about the axis of rotation when the lifting unit is raised.

4. The lifting apparatus of claim 3 further including means interconnecting the base member and the lifting unit for raising the base member during raising of the lifting unit when the wheel means of the lift truck is not in engagement with the base member.

5. The lifting apparatus of claim 3 further including a stop means engageable by the tilting means for preventing the tilting means from rotating to a vertical position and causing the tilting means to swing upwardly without first swinging downwardly.

6. The lifting apparatus of claim 3 further including means for locking the tilting means relative to the base member when the tilting means is disposed in an upwardly tilted position, thereby permitting disengagement of the lift truck from the apparatus.

7. The lifting apparatus of claim 3 wherein at least one of the lower beams includes means engageable by the lift fork of the lift truck for preventing the apparatus from keeling over during lifting of the lifting unit.

8. The lifting apparatus of claim 1 wherein the base member includes a subframe defined by a scissors-type linkage means and an elevating platform carried by the linkage means.

9. The lifting apparatus of claim 1 wherein the base member includes a subframe defined by a crane assembly that includes a swinging member and a jib.

* * * * *